UNITED STATES PATENT OFFICE.

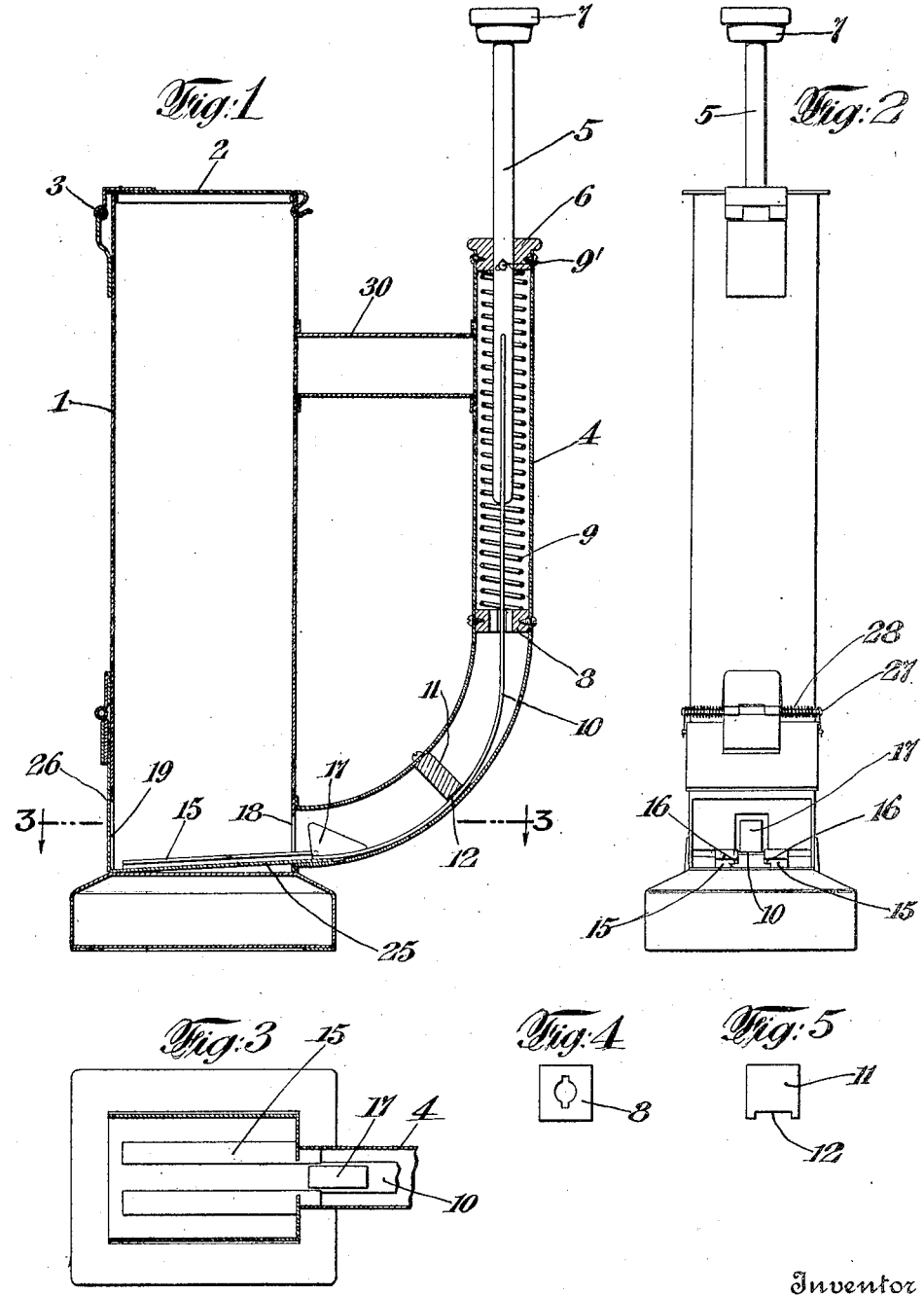

ANNIE S. WATT, OF SCARSDALE, NEW YORK.

DISPENSING DEVICE.

1,335,716.        Specification of Letters Patent.     Patented Mar. 30, 1920.

Application filed November 21, 1916. Serial No. 132,561.

*To all whom it may concern:*

Be it known that I, ANNIE S. WATT, a citizen of the United States, and a resident of Scarsdale, county of Westchester, State of New York, have invented certain new and useful Improvements in Dispensing Devices, of which the following is a specification.

My invention relates to dispensing devices, and particularly to the type of dispensing devices wherein the material to be dispensed is previously made up into units of substantially uniform size and shape.

One object of my invention is to provide a dispensing device within which the units to be dispensed are entirely inclosed.

Another object is to provide a dispensing device from which the units of the material to be dispensed may be removed, a given number at a time.

Another object is to provide a dispensing device which closes automatically whenever no material is being removed therefrom.

Another object is to provide discharging means for a dispensing device which is automatically restored to normal position after a discharging operation, and which is provided with means for preventing undischarged units from interfering with its restoration.

Other and further objects and advantages of my invention will appear from the detailed description, taken in connection with the accompanying drawings forming part of this specification, and will be particularly pointed out in the claims.

In the drawings, in which like reference characters indicate similar parts—

Figure 1 shows a vertical sectional view of the preferred form of a device embodying my invention.

Fig. 2 is a front elevation of the device shown in Fig. 1.

Fig. 3 is a transverse section on the line 3—3 of Fig. 1.

Figs. 4 and 5 are detail views.

There is at this time a desire to keep all food inclosed and thus protect it from any dirt or foreign matter carried by the air or in any other way. There have been some devices developed in which granulated sugar may be contained and protected from foreign matter, and the device herein described as embodying my invention may be used to contain and protect sugar when it is in the lump form.

My device is designed so that it may be used in any place where a neat and ornamental device is desired, but, while I disclose my invention by describing a specific form of my device, it is not intended that my invention shall be limited to this form, but that modifications which occur to those skilled in the art may be made without departing from my invention, and that devices for use in connection with any article of similar or dissimilar nature may be included within my invention.

In the dispensing device herein shown for the purpose of disclosing my invention, the container 1 may have a transverse section of any shape, preferably bearing some relation to the shape of the units which it is desired to dispense. As shown in the drawings, it is rectangular and adapted to accommodate units such as loaf sugar. A cover 2 is provided which may be attached by a hinge 3, or in any other suitable way. It is preferred that the units shall be piled in a regular column within the container. A casing 4 incloses the mechanism, which may be operated to discharge units from the container. This casing also provides a handle for the device. A plunger 5 is positioned within the casing and guided into the top thereof by a perforated plug 6. The top of the plunger is provided with a button 7 of any type, with which the thumb of the operator coöperates. Within the casing 4 there is a perforated partition 8, against which abuts a spiral spring 9. A pin 9' extends through the plunger 5 and coöperates with the upper end of the spiral spring 9, so that the plunger is normally held in its uppermost position, with the pin 9' resting against the under side of the plug 6. Attached to the lower end of the plunger 5, is a flexible extension 10. This flexible member may be attached in any way to the plunger as by being held within a slot, as shown in Fig. 1. A second partition 11 within the casing 4 has a notch 12 in the lower edge thereof, which accommodates the flexible extension 10. The container is provided with a false bottom 25, which has a slight slope, and which has a portion extending through the hereinafter mentioned hole 18, into the casing 4. Extending across the bottom 25 of the container, and part way into the container 4, are guides 15, which have portions 16 extending slightly over the edge of the flexible extension 10. Mounted upon the flexible extension 10 is a pusher 17, which is proportioned to pass between the overhanging portions 16. The back wall of the casing is provided with an opening 18, which is just large enough for the extension 10 and the pusher 17 to pass through, and small enough that units in the container will not be drawn into the casing with the backward stroke of the discharging mechanism. In the front wall of the container there is an opening 19 which is large enough for a single unit to pass through, and not large enough for two units to pass through. Over this opening there is a gate 26, which is attached to the container by the hinge 27. The springs 28 tend to keep the gate 26 in closed position. As a person grasps the handle 4 and depresses the plunger 5 by pressing the thumb upon the button 7, there will be a tendency for the hand to slide upwardly on the casing 4, but the brace 30, which firmly atttaches the casing 4 to the container 1, prevents any such sliding.

While the opening 19 has been described as being only large enough to permit a single unit to pass through, it might be desirable at times to have two units pass through at the same time, but, in that case, it might be limited to prevent three from going through, and it is possible that the discharging mechanism would push units through, one after another, upon the same discharging operation, and one or more at the same time.

The rear face of the pusher 17 is inclined, so that the backward stroke of the discharging mechanism will not be interfered with. It is apparent that when there are units in the container, they may be discharged therefrom by depressing the plunger 5, carrying the discharge mechanism into and through the container, pushing units out through the yielding gate.

It will be seen that I have described a container which may be tightly closed at all times, but from which one or more units of contained material may be discharged at one time, and which will again be closed as soon as the desired number of units has been discharged.

While I have described a device embodying my invention with considerable detail, I do not intend that my invention shall be limited to the features herein described, but intend that modifications thereof may be made so long as they fall within the scope of the hereunto appended claims.

What I claim and desire to secure by Letters Patent of the United States is the following:

1. In a dispensing device, a container having a discharge opening in one side of the body portion of the container adjacent the bottom of said container, a pusher for pushing contained articles through said opening, a fixed lifting handle for said container and an operator for said pusher supported within said handle.

2. In a dispensing device, a container having a discharge opening in one side adjacent the bottom of said container, a lifting handle for said container, said handle being hollow and attached to and communicating with said container near the bottom thereof, a pusher resting on the bottom of said container and an operator for said pusher and positioned within said handle.

3. In a dispensing device, a container, a discharging member, a hollow handle for said container, said handle having a portion spaced from said container, a spring pressed plunger extending into said portion of the handle and a member in said handle for connecting said plunger and said discharging member.

4. In a dispensing device, the combination of a container, means for discharging from one side of the body thereof one or more units of the contained material by one operation thereof, a handle for said container, and an operator for said means mounted within and projecting from said handle.

5. In a dispensing device, the combination of a container, means for discharging from one side of the body thereof one or more units of the contained material by one operation thereof, a handle for said container, and an operator for said means mounted within and projecting from said handle, said operator being biased to a position to hold said means in position to begin a discharging operation.

6. In a dispensing device, the combination of a container, means comprising a pusher for discharging one or more units of the contained material by one operation thereof, a hollow handle for said container, said handle having a portion spaced from said container, and an operator for said pusher mounted within said handle and projecting from said spaced portion thereof.

In testimony whereof, I have signed my name to this specification.

ANNIE S. WATT.